US008135839B1

(12) United States Patent
Wormley et al.

(10) Patent No.: US 8,135,839 B1
(45) Date of Patent: Mar. 13, 2012

(54) SYSTEM AND METHOD FOR LOCKING EXCLUSIVE ACCESS TO A DIVIDED RESOURCE

(75) Inventors: Matthew A. Wormley, San Luis Obispo, CA (US); John L. Farmer, Santa Maria, CA (US)

(73) Assignee: Adobe Systems Incorporated, San Jose, CA (US)

( * ) Notice: Subject to any disclaimer, the term of this patent is extended or adjusted under 35 U.S.C. 154(b) by 310 days.

(21) Appl. No.: 12/130,129

(22) Filed: May 30, 2008

(51) Int. Cl.
*G06F 15/173* (2006.01)
(52) U.S. Cl. ........................................ 709/226; 709/203
(58) Field of Classification Search .................. 709/226, 709/203
See application file for complete search history.

(56) References Cited

U.S. PATENT DOCUMENTS

| | | | |
|---|---|---|---|
| 5,649,185 A * | 7/1997 | Antognini et al. ................. 726/2 |
| 5,944,789 A | 8/1999 | Tzelnic et al. |
| 6,240,414 B1 * | 5/2001 | Beizer et al. ............................. 1/1 |
| 6,278,992 B1 | 8/2001 | Curtis et al. |
| 6,330,572 B1 * | 12/2001 | Sitka ............................. 707/608 |
| 7,266,555 B1 | 9/2007 | Coates et al. |
| 7,529,784 B2 | 5/2009 | Kavuri et al. |
| 7,530,115 B2 | 5/2009 | Carpentier et al. |
| 7,536,377 B1 | 5/2009 | Milne et al. |
| 7,627,726 B2 | 12/2009 | Chandrasekaran et al. |
| 2005/0195660 A1 | 9/2005 | Kavuri et al. |
| 2005/0226059 A1 | 10/2005 | Kavuri et al. |
| 2006/0155705 A1 * | 7/2006 | Kamper et al. ................... 707/8 |
| 2007/0226320 A1 * | 9/2007 | Hager et al. ................. 709/219 |

OTHER PUBLICATIONS

Paul J. Leech, "UUIDs and GUIDs", Feb. 4, 1998 pp. 1-39.*
"U.S. Appl. No. 12/130,141, Non-Final Office Action mailed Apr. 14, 2010", 20.
"U.S. Appl. No. 12/130,141, Final Office Action mailed Oct. 7, 2010", 24 pgs.
"U.S. Appl. No. 12/130,141, Response filed Jan. 7, 2011 to Final Office Action mailed Oct. 7, 2010", 10 pgs.
"U.S. Appl. No. 12/130,141, Response filed Jul. 14, 2010 to Non-Final Office Action mailed Apr. 14, 2010", 10 pgs.
"U.S. Appl. No. 12/130,149, Final Office Action mailed Feb. 17, 2011", 20 pgs.
"U.S. Appl. No. 12/130,149, Non-Final Office Action mailed Sep. 1, 2010", 13 pgs.
"U.S. Appl. No. 12/130,149, Response filed Dec. 1, 2010 to Non-Final Office Action mailed Sep. 1, 2010", 15 pgs.
"U.S. Appl. No. 12/130,232, Non-Final Office Action mailed Dec. 10, 2010", 15 pgs.
"U.S. Appl. No. 12/130,232, Response filed Mar. 10, 2011 to Non Final Office Action mailed Dec. 10, 2010", 17 pgs.

(Continued)

*Primary Examiner* — Ashok Patel
*Assistant Examiner* — Lawrence Cosby
(74) *Attorney, Agent, or Firm* — Schwegman, Lundberg & Woessner, P.A.

(57) ABSTRACT

A method of locking exclusive access to a divided computer resource that may be access by more than one different is disclosed. A computer resource that is divided into more than one piece may require exclusive access to all the individual portions before the computer resource may be used. If more than one client system attempts to access such a divided computer resource, a deadlock situation may occur. To prevent such a deadlock situation, each client that attempts to access the divided resource will issue a globally unique identifier to the divided resource. If more than one client system attempts to access portions of the same computer resource then the globally unique identifier will be used to arbitrate disputes and thus prevent deadlock.

15 Claims, 16 Drawing Sheets

OTHER PUBLICATIONS

"U.S. Appl. No. 12/130,264, Final Office Action mailed Mar. 2, 2011", 16 pgs.

"U.S. Appl. No. 12/130,264, Non-Final Office Action mailed Oct. 25, 2010", 4 pgs.

"U.S. Appl. No. 12/130,264, Response filed Jan. 25, 2011 to Non Final Office Action mailed Oct. 25, 2010", 18 pgs.

"U.S. Appl. No. 12/130,141, Non-Final Office Action mailed May 23, 2011", 20 pgs.

"U.S. Appl. No. 12/130,141, Response filed Aug. 23, 2011 to Non-Final Office Action mailed May 23, 2011", 15 pgs.

"U.S. Appl. No. 12/130,149, Non-Final Office Action mailed May 26, 2011", 18 pgs.

"U.S. Appl. No. 12/130,149, Response filed May 11, 2011 to Final Office Action mailed Feb. 17, 2011", 11 pgs.

"U.S. Appl. No. 12/130,149, Response filed Aug. 26, 2011 to Non-Final Office Action mailed May 25, 2011", 13 pgs.

"U.S. Appl. No. 12/130,232, Final Office Action mailed May 26, 2011", 13 pgs.

"U.S. Appl. No. 12/130,232, Response filed Aug. 26, 2011 to Final Office Action mailed May 26, 2011", 12 pgs.

"U.S. Appl. No. 12/130,264, Response filed Jun. 2, 2011 to Final Office Action mailed Mar. 2, 2011", 12 pgs.

* cited by examiner

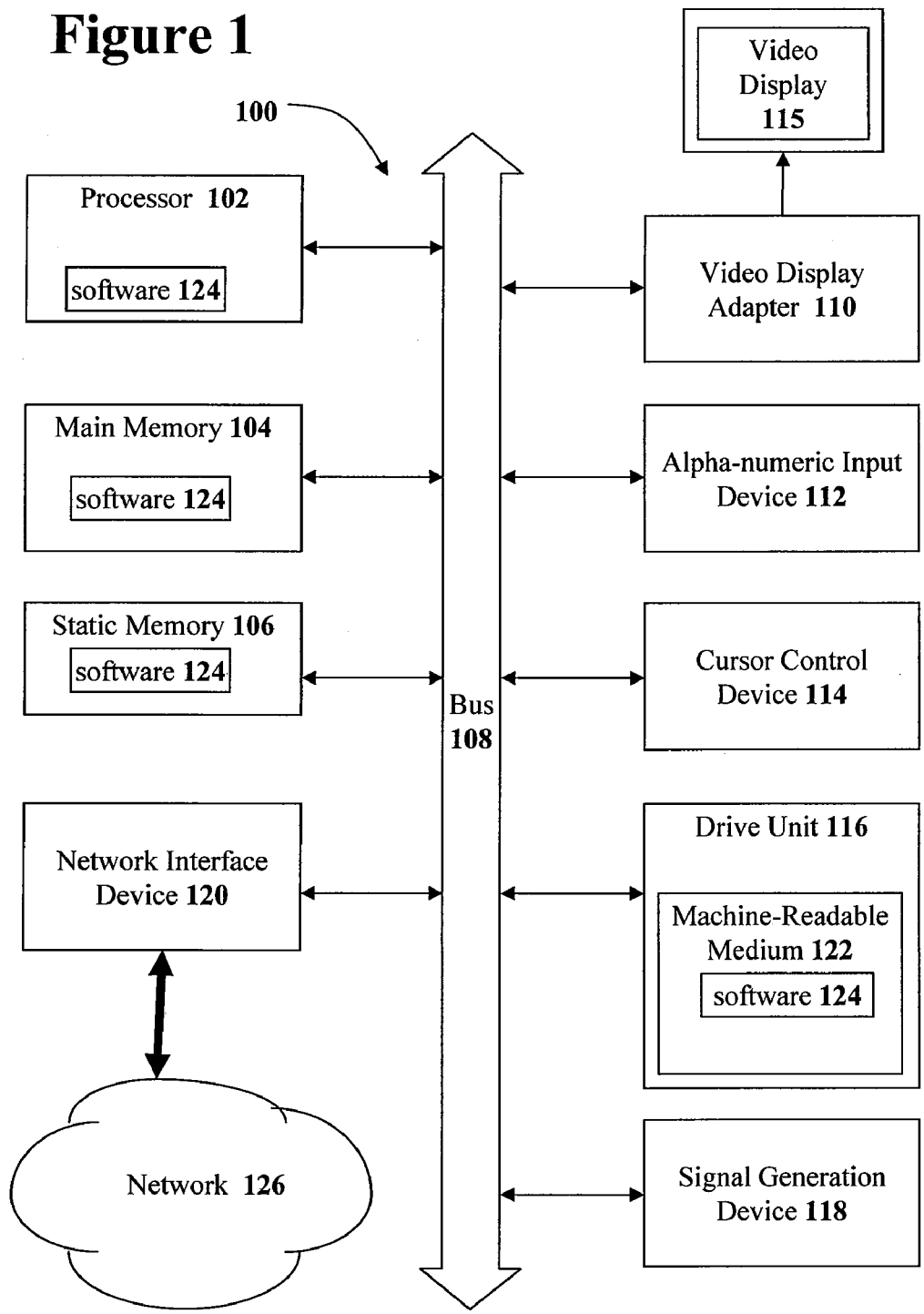

SYSTEM AND METHOD FOR LOCKING EXCLUSIVE ACCESS TO A DIVIDED RESOURCE

RELATED APPLICATIONS

This application is related to co-pending U.S. patent application Ser. No. 12/130,141, entitled "SYSTEM AND METHOD FOR AN EXPANDABLE COMPUTER STORAGE SYSTEM", filed May 30, 2008, commonly assigned herewith.

This application is related to co-pending U.S. patent application Ser. No. 12/130,149, entitled "SYSTEM AND METHOD FOR STORING META-DATA IN A COMPUTER STORAGE SYSTEM", filed May 30, 2008, commonly assigned herewith.

This application is related to co-pending U.S. patent application Ser. No. 12/130,232, entitled "SYSTEM AND METHOD FOR INDEXING META-DATA IN A COMPUTER STORAGE SYSTEM", filed May 30, 2008, commonly assigned herewith.

This application is related to co-pending U.S. patent application Ser. No. 12/130,264, entitled "SYSTEM AND METHOD FOR STORING META-DATA INDEXES WITHIN A COMPUTER STORAGE SYSTEM", filed May 30, 2008, commonly assigned herewith.

TECHNICAL FIELD

The present invention relates to the field of computer networking systems. In particular, but not by way of limitation, the present invention discloses techniques for providing computer server services to large numbers of client computer systems.

BACKGROUND

The global internet has become a mass commercial marketplace. The internet offers a wide variety of media such news websites, downloadable music, and video. The internet also offers commercial services such as investment services, banking, and computer services. The internet even provides a convenient means of obtaining physical products through the use of online merchants and auction sites.

Over the past twenty years many very large commercial businesses have been founded, grown, and prospered on the internet. These internet-centric businesses can provide various goods and services to consumers in a very efficient manner since automated systems are used to perform much of the interaction with the consumers. By reducing interactions with humans, internet bases businesses can save extremely large amounts of money on labor costs. For example, internet-based retail stores display available products to consumers, accept product orders from consumers, and accept payment for product orders in a completely automated manner that does not require any human intervention such that the cost of each sales transaction is kept very low. Thus, by using automated transaction systems, it is not uncommon for a commercial internet-based business to provide goods or services to millions of different customers each day.

In order to provide goods or services to millions of different consumers each day, the computer server systems of a large commercial internet-based business must be designed with great care in order to handle the heavy load of traffic. Since there is little concept of distance on the internet, many internet based businesses provide services to various consumers located world-wide. Being a world-wide provider of services on the internet means that there will virtually always be a customer looking for services no matter what time of day it is such that the server systems the provide the services must be available twenty-four hours each day. And as any successful business owner knows, a key to business success is consistency and reliability of service. Thus, large commercial internet-based business must provide fail-safe mechanisms that will keep the server systems of the internet-based business operating despite the failure of any individual component of the server systems.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 1 illustrates a diagrammatic representation of machine in the example form of a computer system within which a set of instructions, for causing the machine to perform any one or more of the methodologies discussed herein, may be executed.

DETAILED DESCRIPTION

Figure 2A:
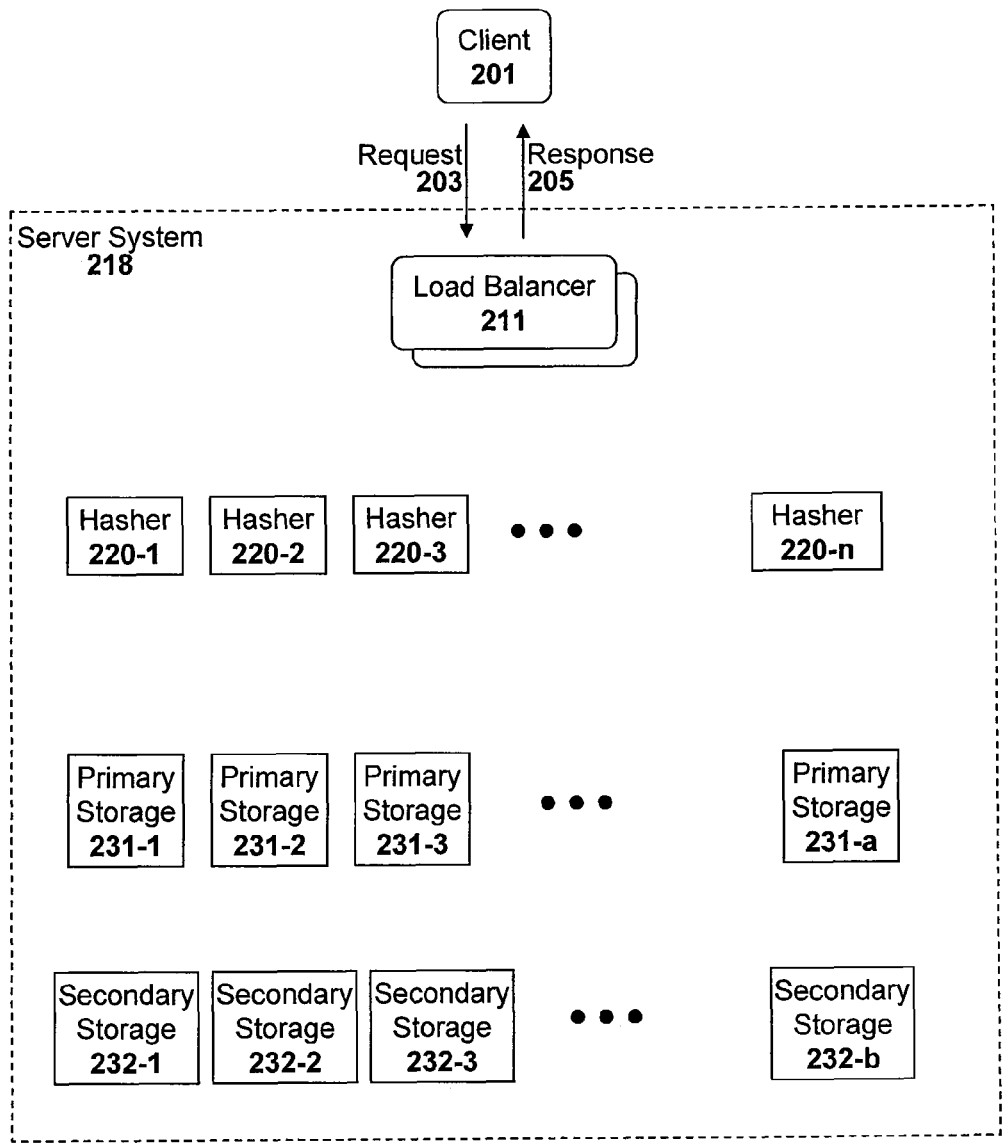
FIG. 2A illustrates one embodiment of a design for a large internet based computer service in the form of a file storage service wherein a client system is accessing a load balancer.

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to the World Wide Web and the current global internet, the teachings of the invention can be used with other types of network services and network protocols. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

FIG. 1 illustrates a diagrammatic representation of a machine in the example form of a computer system 100 within which a set of instructions 124, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network server, a network router, a network switch, a network bridge, or any machine capable of executing a set of instructions (sequential or otherwise) that specify actions to be taken by that machine. Further, while only a single machine is illustrated in FIG. 1, the term "machine" shall also be taken to include any collection of machines that individually or jointly execute a set (or multiple sets) of instructions to perform any one or more of the methodologies discussed herein. Furthermore, a single machine may be used to designate a cluster of computer systems that are all assigned to provide the same computer service.

The example computer system 100 illustrated in FIG. 1 includes a processor 102 (e.g., a central processing unit (CPU), a graphics processing unit (GPU) or both), a main memory 104, and a static memory 106 that may communicate with each other via a bus 108. The computer system 100 may further include a video display adapter 110 that drives a video display system 115 such as a Liquid Crystal Display (LCD) or a Cathode Ray Tube (CRT). The example computer system 100 also includes an alphanumeric input device 112 (e.g., a keyboard), a cursor control device 114 (e.g., a mouse or trackball), a disk drive unit 116, a signal generation device 118 (e.g., such as a sound system for driving a speaker), and a network interface device 120. Note that various embodiments of a computer system will not always include all of these peripheral devices.

The disk drive unit 116 includes a machine-readable medium 122 on which is stored one or more sets of computer instructions and data structures (e.g., instructions 124 also known as 'software') embodying or utilized by any one or more of the methodologies or functions described in this document. The computer instructions 124 may also reside, completely or at least partially, within the main memory 104, the static memory 106, and/or within the processor 102 during execution thereof by the computer system 100. Thus, the main memory 104, static memory 106, and the processor 102 also constituting machine-readable media.

The computer instructions 124 for operating computer system 100 may be transmitted or received over a computer network 126 via the network interface device 120 utilizing any one of a number of well-known transfer protocols such as the File Transfer Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, flash memory, and magnetic media.

For the purposes of this specification, the term "module" includes an identifiable portion of computer code, computational or executable instructions, data, or computational object to achieve a particular function, operation, processing, or procedure. A module need not be implemented in software; a module may be implemented in software, hardware/circuitry, or a combination of software and hardware.

Client-Server Operations on the Internet

Computer systems that are coupled to a computer network and listen for service requests from other computer system and then provide services when requested are known as "server" computer systems. Typical services provided by server computer systems include storing and retrieving computer files, performing specific processing tasks, responding to search requests, and resolving network addresses. The computer systems that request services from server computer systems are known as "client" computer systems.

On the global internet, two very well known server based applications are email and the World Wide Web (commonly known just using the term 'web'). With email, a personal computer user typically runs a local email client program on the user's personal computer system. When the user wishes to send a newly composed email message or check if the user has received any new email messages, the local email client program will contact a designated email server system and request that the email server system route the new composed email or check for new email, respectively. With the World Wide Web, a personal computer user typically runs a web browser program on the computer user's local personal computer system. When the user wishes to view an internet web site on the World Wide Web, the user enters a network address of the desired web site into the web browser program such that the web browser program contacts the web server at the specified network address, requests the files needed to display the web page from the web server at that network address, receives the files from the web server, and then displays the web page on the display of the local personal computer system.

Most internet based commercial businesses operate by placing server computer systems on the internet such that consumers may access their server computer systems using personal computers, cellular telephones, and any other type of consumer owned computer system that is coupled to the Internet. Virtually all internet based commercial businesses provide a web site that acts at least as an initial contact point for internet based consumers. Continued contact with the consumers may be through that web site or through other means such as telephone, email, or a custom application downloaded by the consumer onto the consumer's computer system.

Large Scale Client-Server Operations on the Internet

To run a large scale business operation on the internet, the client-server model of computing described in the previous section must be greatly scaled up in order to deal with thousands or millions of consumers. In order to be able to serve a very large number of consumer client systems making requests, an internet based commercial business will generally replicate the various server systems such that a very large number of consumers can be handled concurrently.

FIG. 2A illustrates one embodiment of a design for a large commercial internet based operation. In the example large internet based system of FIG. 2A, a primary service provided to client systems may be the storage and retrieval of computer files for the clients of the service provider. The computer files may contain anything such as medical records, images, video, documents, etc. The internet based system for providing service to the client systems illustrated in FIG. 2A is comprised of many individual elements that are collectively referred to as the "server system" 218.

The overall design goal of the server system 218 disclosed in FIG. 2A is to provide reliable computer file services to a very large number of individual client computer systems on a non-stop (twenty-four hours per day) basis. To achieve this goal, there are back-up systems for each separate part of the overall server system 218 such that if any single part of the server system 218 fails, the overall server system 218 will continue operating and providing services to the clients. Furthermore, the failed part of the overall server system 218 may be replaced while the server system 218 continues to operate. Ideally, no data will be lost and the overall server system 218 will continue operating while maintenance is performed on individual parts of the server system 218.

To explain the basic operation of the server system 217 of FIG. 2A, an example file request 203 from a client system 201 will be described in detail. When initially contacting the server system 218, the file request 203 from client system 201 will be directed to a load balancer system 211. Note that although only a single load balancer system 211 is illustrated in FIG. 2A, a back-up load balancing system may be running in parallel with the load balancer system 211 and ready to take over should the primary load balancer system 211 fail.

The load balancer system 211 may consider the current load of the various systems and then proceed in a manner dependent on the load of the various systems. In one embodiment, the load balancer system 211 will provide a response 205 to the client system 201 that will specify a next system to consider the file request. The response 205 may take the form of a "redirect response" that will instruct the client system 201 to redirect the file request to a specific system, such as hasher system 220-2, that will further process the file request. In other embodiments, the load balancer will forward the request directly to the next part of the server system 218 that will process the request such that there are no re-directs. In such an embodiment, the load balancer system 211 may be the only contact point for outside client systems. However, this document will continue describing an embodiment that uses re-directs such the client system 201 communicates directly with various different parts of the server system 218.

Figure 2B:
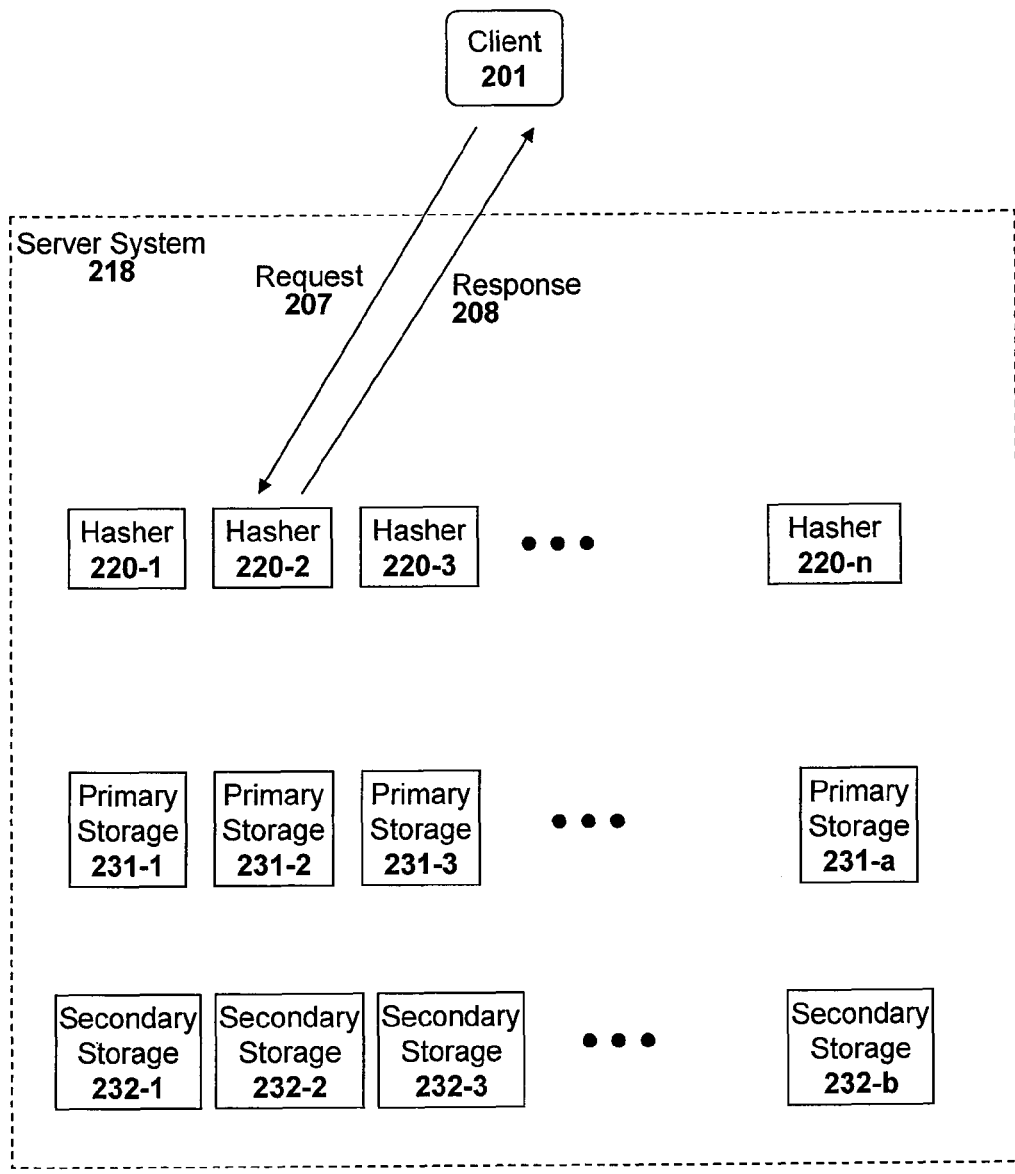
FIG. 2B illustrates the internet based file storage service of FIG. 2A wherein the client system is accessing a hasher system.

FIG. 2B illustrates a continuation of the file request example from FIG. 2A. (The load balancer system 211 from FIG. 2A has been removed in FIG. 2B for clarity.) In FIG. 2B, the file request 207 from client system 201 has been redirected to hasher system 220-2. The task for hasher system 220-2 is to determine the network address of a specific storage system in an array of storage systems that will actually handle the file request. In one embodiment, hasher system 220-2 uses a hash function to create a hash value from the filename of the requested file that will be used to identify a specific storage system that will handle the file request. The network address of the storage system identified with the hash value may be returned to client system 201 in response message 208. (As set forth above, the hasher system may directly forward the file request to storage system identified by the hash value in an alternate embodiment of the system.)

By creating a hash value from the filename of the requested file and using that hash value to select a specific storage system from a storage system array, the task of storing files can be spread out across many different storage systems in the storage array. Furthermore, each of the individual storage system illustrated in FIGS. 2A to 2C may actually be implemented as a cluster of individual storage servers such that greater redundancy and storage capacity is achieved.

Figure 2C:
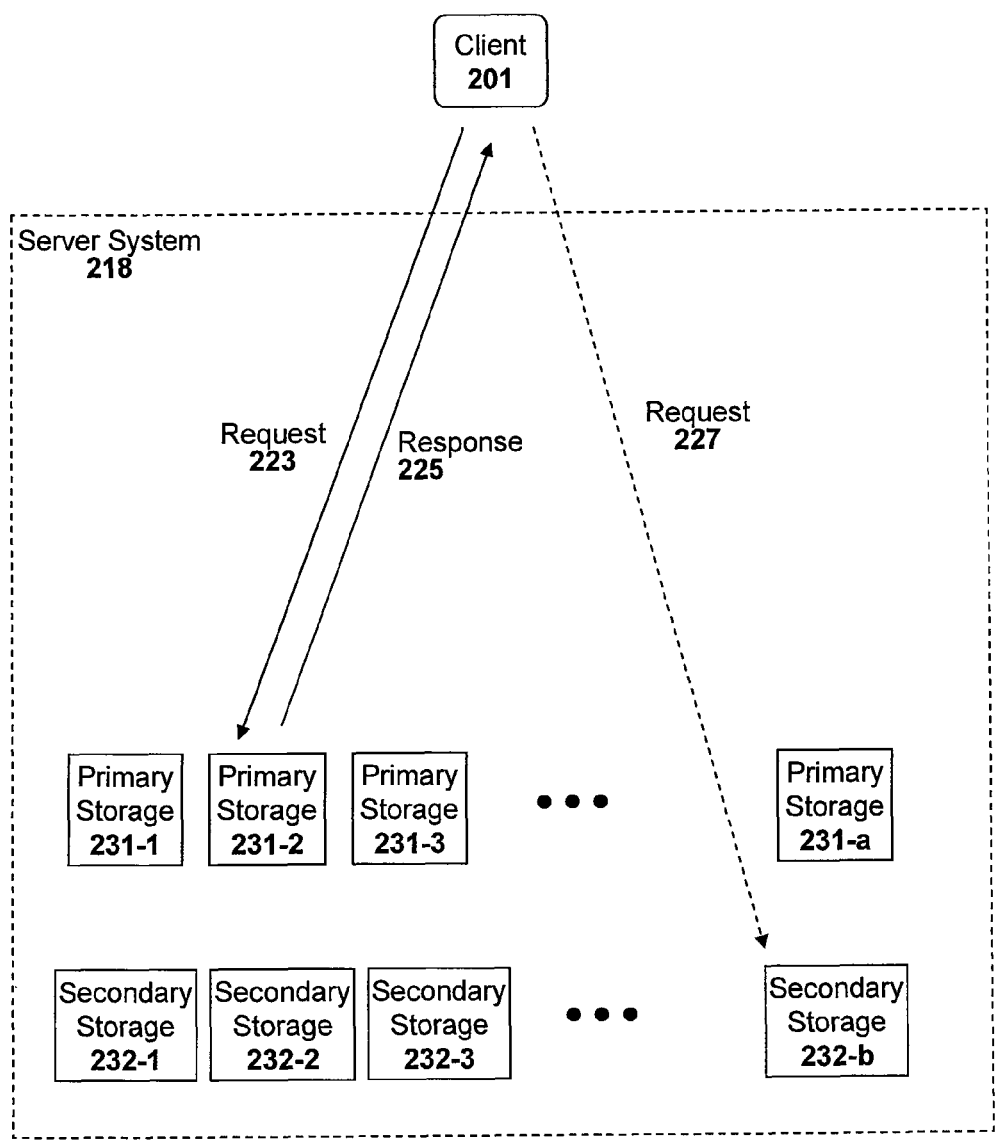
FIG. 2C illustrates the internet based file storage service of FIG. 2B wherein the client system is accessing a storage system.

In the example embodiment disclosed in FIGS. 2A to 2C, the hasher systems actually identify two separate storage systems for the requested file. A first storage system specified is a primary storage location for the requested file and the second storage system is a back-up storage location for the requested file. In this manner redundancy is achieved such that the requested file may be still be retrieved even if one of the two different storage systems fails. Ideally, the primary storage system and the secondary storage system are situated in a manner such that the cause of a failure for one of the system will not cause the failure of the other storage system. For example, the primary storage system and the secondary storage system may be located in two different racks or in two different buildings such that a power outage to one rack or building will not affect the other rack or building. It should be noted that although this document will refer to "primary" and "secondary" storage systems, these two different storage systems may be completely equal and neither the "primary" or "secondary" copy of a particular file has priority over the other copy of the file.

Referring back to the example file request in FIG. 2B, the response message 208 may contain the addresses of the primary storage system and the secondary storage system for the requested file. In the current file request example, hasher system 220-2 may indicate in the response message 208 that primary storage system 231-2 contains the primary copy of the requested file and secondary storage system 232-$b$ contains the back-up copy of the requested file.

FIG. 2C illustrates a continuation of the file request example from FIG. 2B. (The hasher systems 220-1 to 220-$n$ of FIG. 2B have been removed from FIG. 2C for clarity.) In FIG. 2C, the file request 223 from client system 201 has now been redirected to primary storage system 231-2 that was identified by the hasher system as the primary storage system for this particular file. Primary storage system 231-2 may response to file request 223 by providing the requested file in response 225.

If primary storage system 231-2 fails to respond, indicates that it cannot locate the requested file, or indicates that the requested file has been corrupted then client system 201 may access the back-up version of the requested file. Thus, client system 201 may send a subsequent request 207 to the identified secondary storage system (secondary storage 232-$b$) to retrieve the back-up copy of the requested file. When such events occur, the administrator of the server system 218 should be notified of the failure such that it may be investigated. Furthermore, the server system 218 should attempt to reconstruct the copy of the file within primary storage system 231-2 using the back-up copy from secondary storage system 232-$b$ if primary storage system 231-2 indicated the file was corrupted.

On-the-Fly Reconfiguration of the Storage System

As set forth above, an important goal of many interne server systems is to provide continuous availability of services such that such that customers world-wide can access the provided services at any time of day. With a server system that is continually operating, it becomes extremely difficult for system administrators to upgrade or expand the server system. Thus, careful design is required to allow server systems to continue operating while upgrades to the server system are concurrently performed.

In the internet-based storage server system 218 illustrated in FIGS. 2A to 2C, it is expected that the amount of computer file storage space needed to handle all of the customers will grow over time. As more and more customers begin using the file storage service, the initial storage space of the server system 218 will eventually begin to fill up.

One method of adding additional storage capacity to the storage server system 218 is to add storage capacity to each of the individual storage units illustrated (such primary storage 231-1, primary storage 231-2, etc.). Note that an individual storage unit can be taken out of service without affecting the overall server system 218 since the back-up storage units (secondary storage 232-1, secondary storage 232-2, etc.) will handle the file storage and retrieval for any primary storage unit taken out of service. Although adding storage capacity to each storage unit will increase the overall storage space that is available, the amount of processing power to handle file storage and retrieval requests from an increasing number of consumers will not be increased in this manner such that processing power may become a bottleneck in the overall storage server system 218. Thus, the performance of the storage server system 218 will suffer.

Another method of increasing storage capacity to the storage server system 218 is to add additional computing systems to each of the storage units illustrated if each of the storage units represents a computer cluster. In this manner, both the file storage capacity and processing power is increased for each individual storage unit. However, this method of adding more storage capacity to the server system 218 will create more dependency on each individual storage cluster such that if a particular storage cluster fails, more stored files (and hence more customers) will be affected by the failure. Furthermore, each storage cluster may have a limit as to how much additional computing power can be added to the storage cluster.

To allow additional storage capacity to be added to the file storage server system 218, one embodiment of the invention allows additional individual storage units to be added to the array storage systems. In order to allow this type of storage capacity expansion, a novel system was developed to accommodate the newly added storage systems. The method allows additional storage systems to be added to the storage system array during the operation of the storage system array such that there is no down time of the file storage server system 218. To best disclose the system of accommodating new storage units, a detailed example will be provided.

Figure 3A:
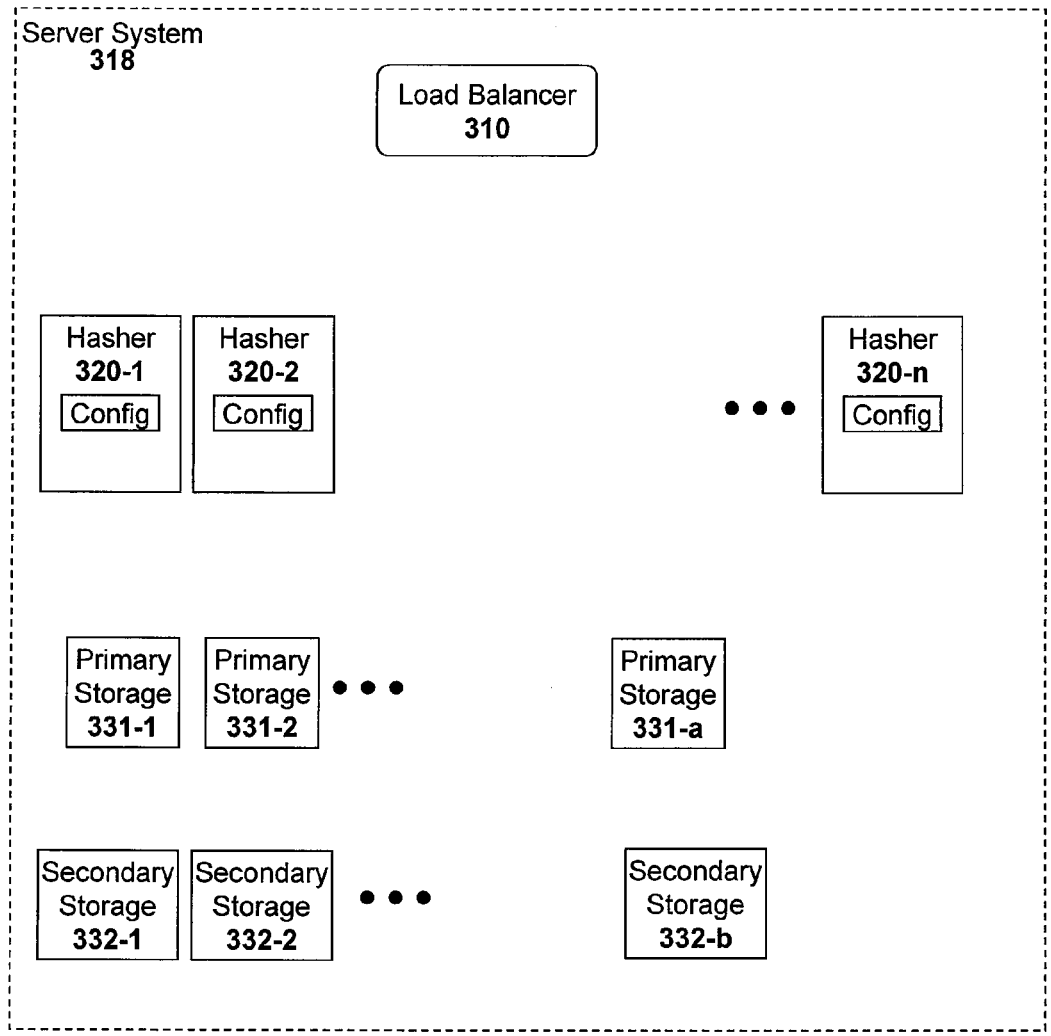
FIG. 3A illustrates the internet based file storage service of FIG. 2A wherein each hasher system has a configuration file that may contain the hash function used and a description of the storage system.

FIG. 3A illustrates a file storage server system 318 similar to the file storage server system 218 illustrated in FIGS. 2A to 2C. In the file storage server system 318 of FIG. 3A, each of the hasher systems 320-1 to 320-$n$ used to apply a hash function to filenames includes a configuration file "Config" that fully describes the array of storage systems that are being used to store files and how to hash the filenames of incoming file requests in order to select a pair of storage units (a primary storage unit and a secondary storage unit) to service the file request.

In the example file storage server system 318 of FIG. 3A, the primary storage system array includes 'a' individual units of storage (primary storage system 331-1 to primary storage system 331-$a$). Similarly, the secondary storage system array includes 'b' individual units of storage (secondary storage system 332-1 to secondary storage system 332-$b$). (Note that a and b may be equal but certainly do not have to be equal.) Thus, the configuration file "Config" in each of the hasher systems 320-1 to 320-$n$ will fully describe the primary storage system array (331-1 to 331-$a$) and the secondary storage system array (332-1 to 332-$b$). In should be noted that this is a simplified example of configuration file information for illustration purposes only. An actual implementation of a configuration file may include much more detailed information such as rack numbers, network addresses, storage unit sizes (the individual storage units may vary in size), storage system performance specifications, specific hash function specifications and parameters, etc.

To add new storage unit to a file storage server system that uses the teachings of the present disclosure such as file storage server system 318 of FIG. 3A, a system administrator may simply add new individual storage units to the storage system array and then add a new configuration file the hasher systems (320-1 to 320-$n$) that informs the hasher systems about the newly available storage units while keeping the old storage system configuration file available to each of the hasher systems. An example of the server system 318 of FIG. 3A with added storage units added to both the primary storage array and the secondary storage array is illustrated in FIG. 3B.

Figure 3B:
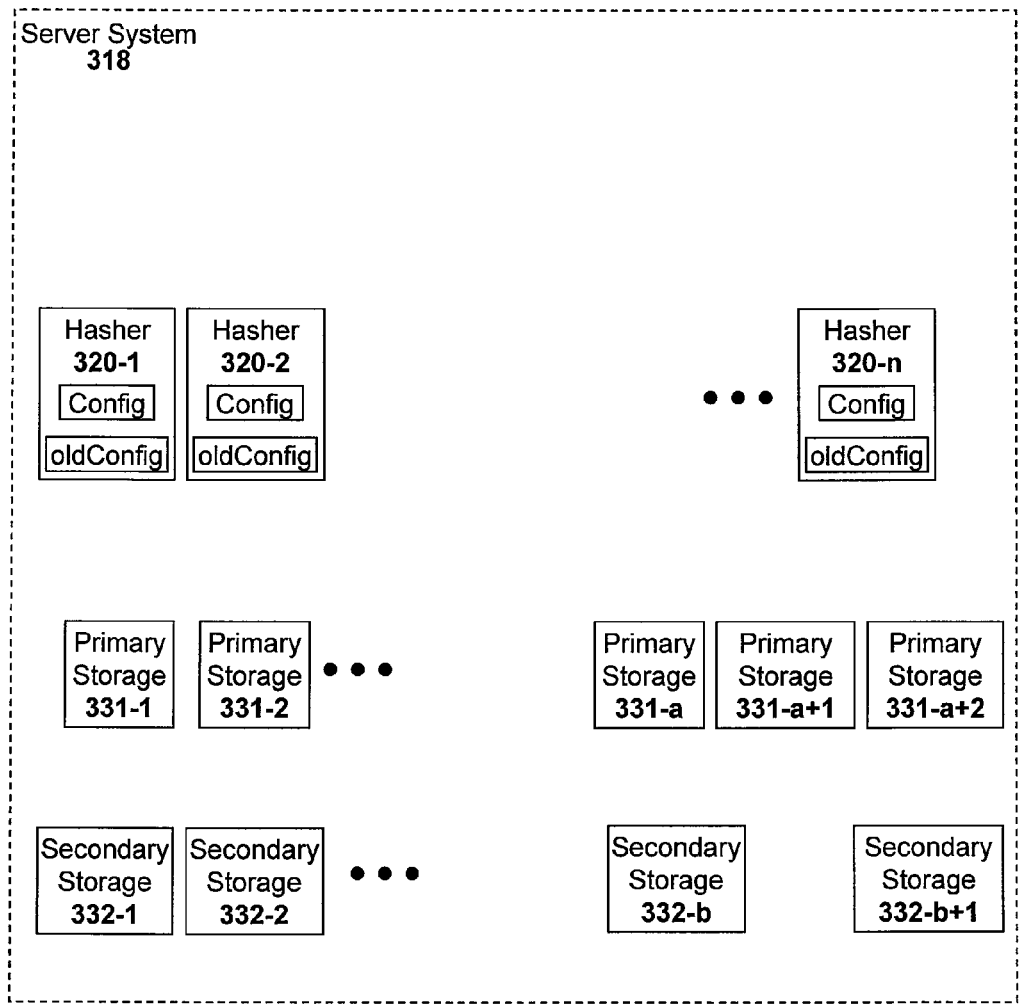
FIG. 3B illustrates the internet based file storage service of FIG. 3A with additional storage units added and wherein each hasher system has a new configuration file that describes the updated storage system and an old.

FIG. 3B illustrates the file storage server system 318 of FIG. 3A wherein two additional storage units have been added to the primary storage system array and one additional storage system has been added to the secondary storage system array. Specifically, primary storage units 331-$a$+1 and 331-$a$+2 have been added to the primary storage system array and secondary storage unit 332-$b$+1 has been added to the secondary storage system array. In order to take advantage of these new storage units that have been added to the storage system arrays, a new configuration file "Config" has been added to each of the hasher systems 320-1 to 320-$n$. However, the original configuration file is also kept within each of the hasher systems 320-1 to 320-n but the original configuration file has been renamed "oldConfig". The server system 318 will then operate using both configuration files (Config and oldConfig) until a full conversion to the new configuration file "Config" has taken place.

The system operates with both configuration files by using the new configuration file "Config" as the primary configuration file. However, when the system does not yield the desired result with the new configuration file then the original configuration file "oldConfig" will be used as necessary. The use of the two configuration files is best illustrated by the use of examples. A file read example and a write example will be presented.

Figure 3C:
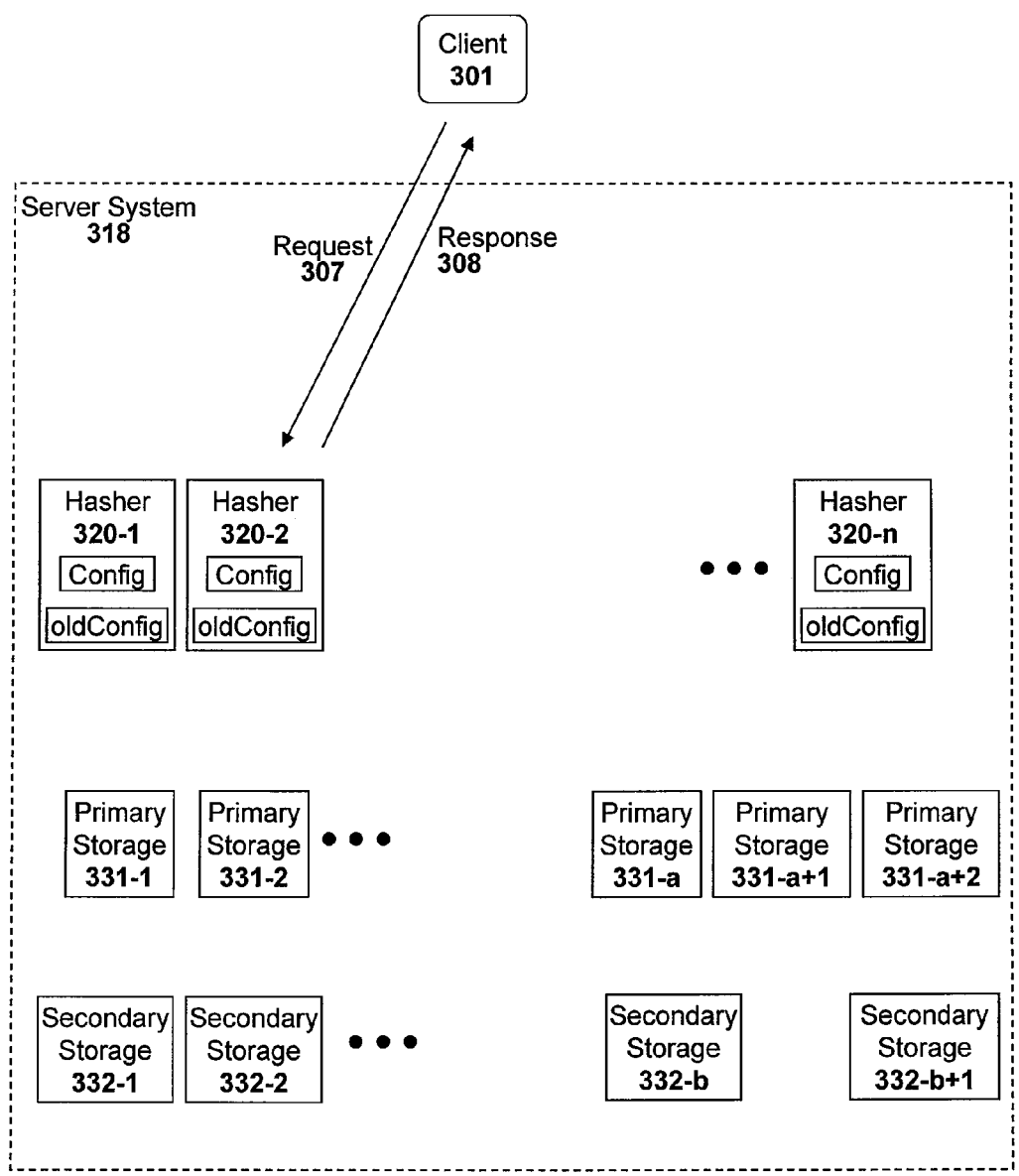
FIG. 3C illustrates the internet based file storage service of FIG. 3B wherein a client system is requesting a file from a hasher system.

FIG. 3C illustrates a client system 301 that has already gone through the load balancing step (See FIG. 2A) and is now requesting hasher system 320-2 to identify specific storage units that should be accessed in order to read a specified file. Hasher system 320-2 will consult the most recent configuration file ("Config") and respond with the address of the storage units that should be accessed to read the requested file. In this example, primary storage unit 331-$a$+1 is designated as the primary storage unit for the request file and the secondary storage unit assigned for the file will be omitted for clarity. In addition, Hasher system 320-2 may consult the older configuration file ("oldConfig") and include the network address of the storage unit that needed to be accessed under the earlier storage system array configuration (primary storage unit 331-$a$ for purposes of the example). Note that this step of consulting the older configuration file ("oldConfig") may be performed at a later time in other embodiments of the system. Furthermore, note that the load balancer (not shown) could be accessing the hasher system on behalf of the client system 301 instead of having the client system 301 directly access the hasher system as illustrated in FIG. 3C.

Figure 3D:
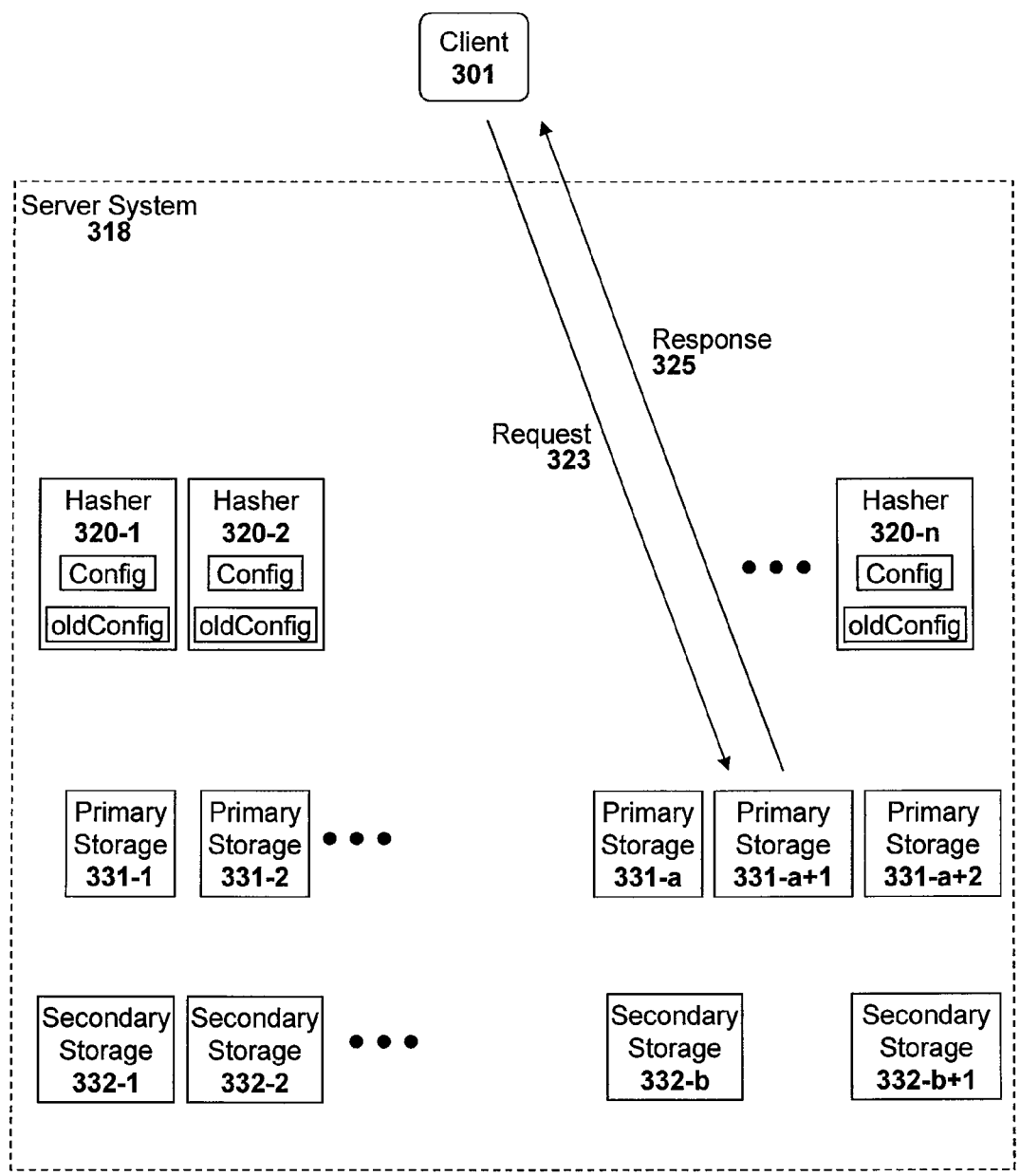
FIG. 3D illustrates the internet based file storage service of FIG. 3C wherein a client system is requesting a file from a first storage system identified by the hasher system using the most recent configuration file.
Figure 3E:
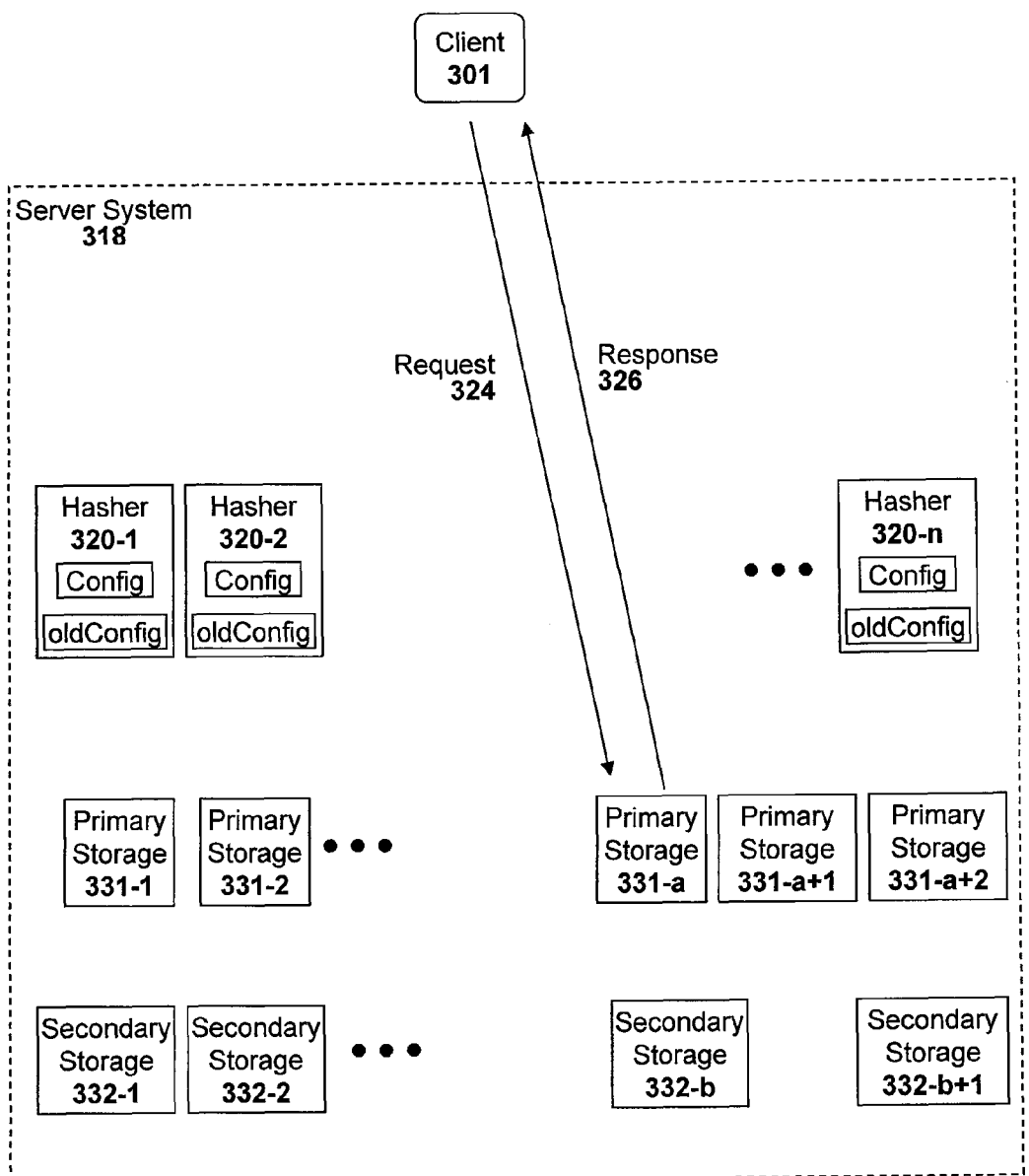
FIG. 3E illustrates the internet based file storage service of FIG. 3D wherein a client system is requesting a file from a second storage system identified by the hasher system using an earlier configuration file.

Next, as illustrated in FIG. 3D, the client system 301 will then attempt to access the requested file using the primary storage unit 331-$a$+1 that was designated by the current configuration file ("Config") with request 323. If primary storage unit 331-$a$+1 has a copy of the requested file, then primary storage unit 331-$a$+1 will respond with the requested file in response 325. At this point the file request will be fulfilled. Note that in an alternative embodiment of the system, the hasher system may be making the file request to the storage unit on behalf of the client system 301.

If primary storage unit 331-$a$+1 has the requested file but has determined that the requested file is corrupted, then the primary storage unit 331-$a$+1 will respond to client system 301 with a message in response 325 stating that that the request file has been located but that it was corrupted. In such circumstances, the client system 301 should then consult the secondary storage system that was designated by the hasher system using current configuration file ("Config") with response message 308 in FIG. 3C.

If primary storage unit 331-$a$+1 was only recently added to the file storage server system 318 then the requested file may not yet be located in primary storage unit 331-$a$+1. In such a case, primary storage unit 331-$a$+1 will respond to client system 301 with response 325 stating that primary storage unit 331-$a$+1 does not have the requested file and is unaware of the requested file. When this occurs, the client system 301 may then attempt to use the location of desired file under the old configuration of the hasher system ("oldConfig"). Specifically, client system 301 will then make a request 324 to primary storage unit 331-$a$ (since that was the storage unit that should have file under the old configuration) as illustrated in FIG. 3D. If primary storage unit 331-$a$ has the requested file, then primary storage unit 331-$a$ will respond with the requested file in response 326. At this point the file request will be fulfilled. If primary storage unit 331-$a$ does not have the requested file or indicates that the request file is corrupted, then client system 301 will then attempt to access the requested file in the secondary storage unit associated with the requested file.

Writes to the storage system are handled in a similar manner. Referring back to FIG. 3C, when client system 301 attempts to write a file to the storage system 318, the client system 301 will first request a hasher system for the network address of the storage units for storing the file with request message 307. The hasher system will respond with response message 308 containing the network address of the primary storage unit (primary storage unit 331-$a$+1 in this example) and the secondary storage unit for storing the file. The response message 308 may also contain the network address of the previous storage unit used to store the file under the old configuration ("oldConfig"). The client system 301 will then write the file to the specified storage units. (Again, note that this write being performed by the client 301 in this embodiment may instead be performed by the hasher system 320-2 on behalf of the client system 301 in alternate embodiments.)

If the write of the file to location designated by a current configuration is successful then the system may inform the storage unit that may have previously stored the file under the old configuration that such a storage unit may now delete its outdated version of the file. For example, in this example, after client system 301 has successfully written a file to primary storage unit 331-$a$+1, then client system 301 may inform primary storage unit 331-$a$ (the storage location for the file under the old configuration) to delete its copy of the file since it is no longer valid or nor needed (since the file is now stored in primary storage unit 331-$a$+1. Thus, as files are accessed and written back to the file storage server system 318, the files will be moved to their new designated locations (as designated by the new configuration file). Again, note that the writing of the file and request of the deletion of the old file may be performed by the hasher system instead of by the client system 301. In fact, such an embodiment has the advantage that the software in the hasher system cannot be easily modified by a malicious user that might attempt to modify the software in the client system 301 in order to alter the way the system operates.

In addition to the slow migration of files that will occur due to clients accessing files and then writing the files back, additional background processes may be used to actively move files from the old configuration to the new configuration. In one embodiment, these file migration programs are referred to as "nurse" programs since these programs are 'healing' the file system.

Figure 3F:
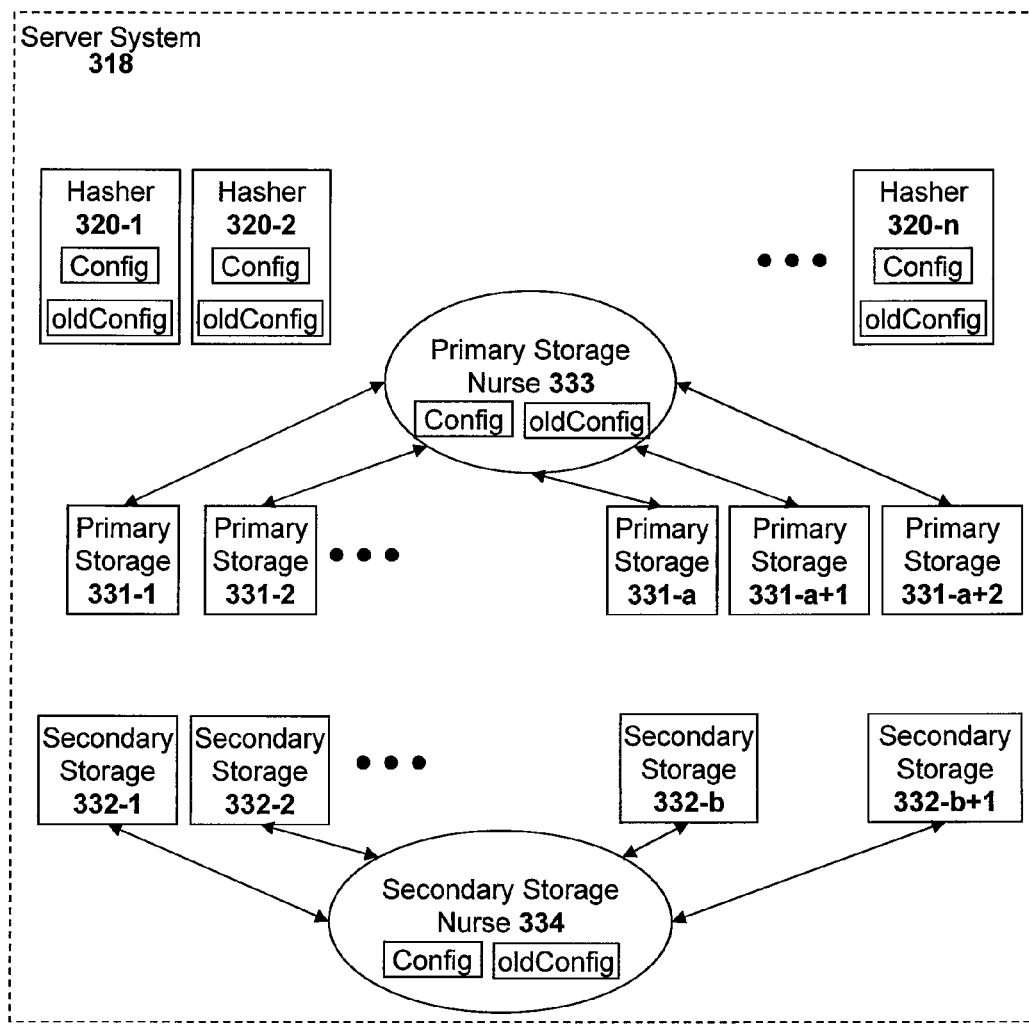
FIG. 3F illustrates the internet based file storage service of FIG. 3A wherein a nurse program is updating the storage location of files from an earlier hasher configuration file to the storage location of the files using a newer hasher configuration file.

FIG. 3F illustrates a primary storage array nurse program 333 and a secondary storage array nurse program 334. These two nurse programs go through every file that has been stored in the file storage server system 218 and determines if each file has been moved to the proper location under the new storage array configuration ("Config"). If a nurse program determines that a particular file is not located at the proper location under the latest storage array configuration then that nurse program will move the file to the proper location as dictated by the new configuration file. Specifically, the nurse programs (333 and 334) will read the file from its (old) original location using the old configuration ("oldConfig") and then write the file using the latest configuration ("Config").

Once the nurse programs (333 and 334) determine that every file in the storage system array has been checked and moved if necessary, the old configuration file ("oldConfig")

can be discarded from the hasher systems 320-1 to 320-n and the nurse programs may be terminated. Note that more than one old configuration file may be used if additional storage is added to the system before all of the files have been moved to their new designated locations. For example, the hasher systems may have three different configuration files: a current configuration file and two older configuration files. In such a case, the system will always write files using the latest configuration files but the older configuration files will be used by the nurse programs, when a requested file is not located in the position indicated by the most current configuration file, and when deleting older file versions after writing back a file using the most current configuration file.

Deadlock Prevention

The disclosed storage system is intended to provide services to a very large number of clients on a continuous basis. Although many customers will create their own accounts and only use their own files, many customers will desire to share files among a set of authorized users. For example, a business may use the file storage server system for off-site storage. The business may specify a set of authorized users that are allowed to access the off-site storage.

When there is more than one user that may attempt to access to a single file, a file consistency problem can arise. Specifically, if two users access the same the file, both make edits to that file, and then both attempt to write back their different versions of the file to the same location then what should happen? In such a case, there are then two different versions of the same file with no obvious method of determining which version is the version that should be given the original file name.

To prevent such situations from occurring, many file systems use "lock-out" systems wherein only one user is allowed to access a file and edit any file. No other user is allowed to edit the same file while another user is already editing the same file. (In some systems, a second user may be allowed to read a file in use by another user but that second user will not be allow to write the file back to the same location.) Such a lock-out system is implemented in one embodiment of the present invention.

As set forth in the server storage system 218 of FIGS. 2A to 2C, there are two copies of each file in the system: a first copy in the primary storage system array and a second copy in the secondary storage system array. This particular arrangement may create a deadlock situation when two different customers attempt to access and enter a lock-out mode in order to edit the same file. An example of the potential deadlock problem is illustrated with reference to FIGS. 4A and 4B. To prevent the deadlock situation, a solution to this potential deadlock problem is illustrated with reference to FIGS. 4C to 4F. In the examples set forth in FIGS. 4A to 4F, hasher systems (401 and 402) will be illustrated accessing storage on behalf of client systems. However, as set forth earlier in the earlier examples, client systems may instead directly access the file storage units in other embodiments of the file storage server system.

Figure 4A:
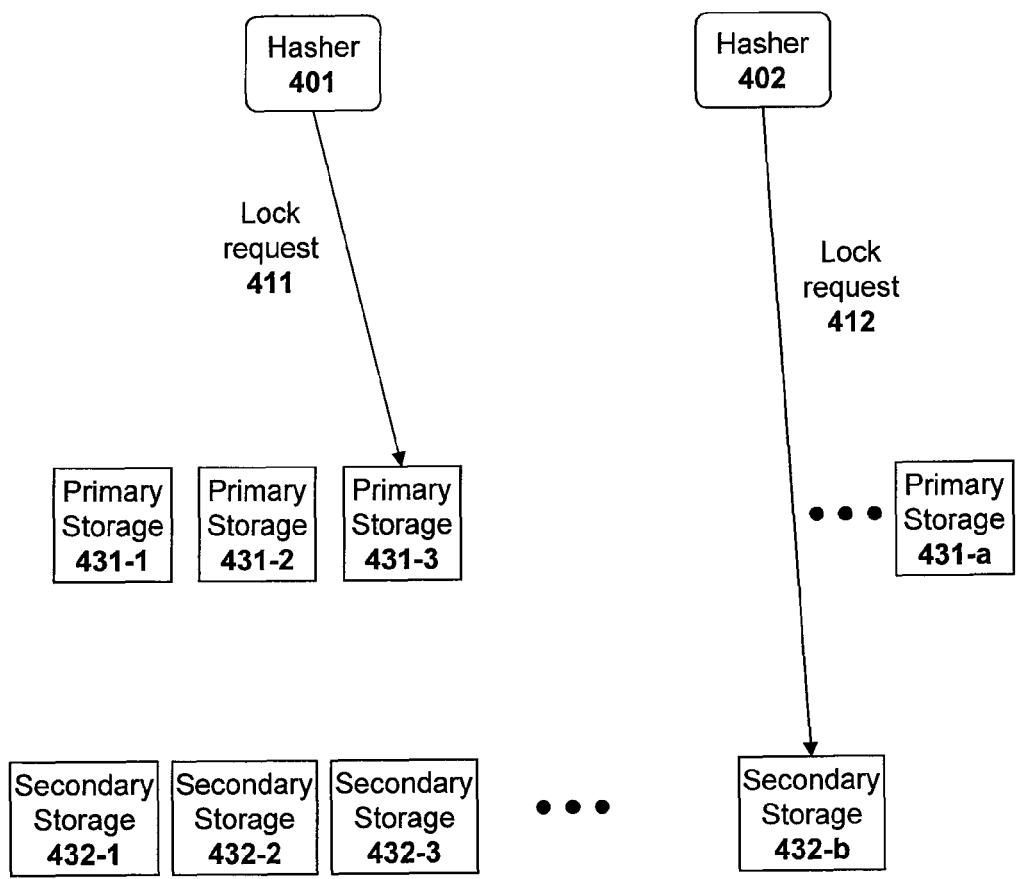
FIG. 4A illustrates the internet based file storage service of FIG. 2A wherein two hasher systems are attempting to simultaneously access the same stored file.
Figure 4B:
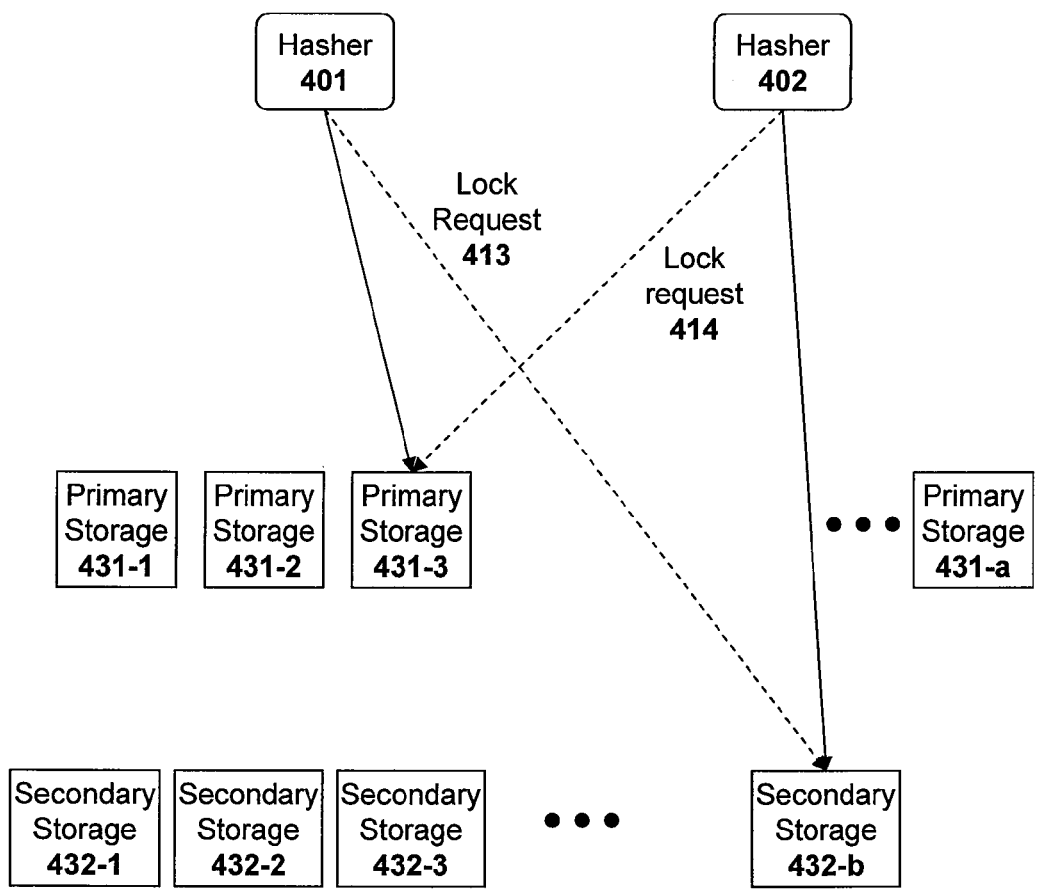
FIG. 4B illustrates the internet based file storage service of FIG. 4A wherein the two hasher systems have each accessed one version of the same stored file and are each attempting to access the other version of the same file.

FIG. 4A illustrates two different hasher systems, hasher system 401 and hasher system 402, which are beginning an attempt to access the same file in the file storage server system on behalf of client systems. When the hasher systems 401 and 402 attempt to access a file, each hasher system first attempts to "lock" both the primary and the secondary copy of the file so that no other hasher system can access the locked file. However, the packet-switched architecture of TCP/IP does guarantee that all data packets will be transmitted reliably and does not guarantee that packets will arrive in the same order the packets are sent. Thus, even if both hasher systems first attempt to lock the primary file and then lock the secondary file, the lock requests may not be delivered in that order. Thus, hasher system 401 may obtain a lock on the primary version of the requested file in primary storage unit 431-3 and hasher system 402 may obtain a lock on the secondary version of that same file in secondary storage unit 432-b as illustrated in FIG. 4A. When the other lock request messages (lock request messages 413 and 414 as illustrated in FIG. 4B) are received by the storage units, hasher system 401 will find that the secondary version of the file has already been locked by hasher system 402 and hasher system 402 will find that the primary version of the requested file has already been locked by hasher system 401 as illustrated in FIG. 4B. Neither hasher system 401 nor hasher system 402 will be able to access both versions of the requested file such that the file storage server system can become deadlocked.

To prevent the deadlock situation illustrated in FIG. 4B, a "Globally Unique Identifier" (GUID) may be given by each hasher system attempting to access a particular file to the storage system. If there is a contention due to two different hasher systems attempting to access the same file, then the globally unique identifier (GUID) may be used to determine a hasher system that will be granted exclusive access to the file. A globally unique identifier (GUID) is a special type of identifier used in software applications in order to provide a reference number which is unique in any context. The use of a globally unique identifier (GUID) to prevent a deadlock situation is set forth in FIGS. 4C to 4F.

Figure 4C:
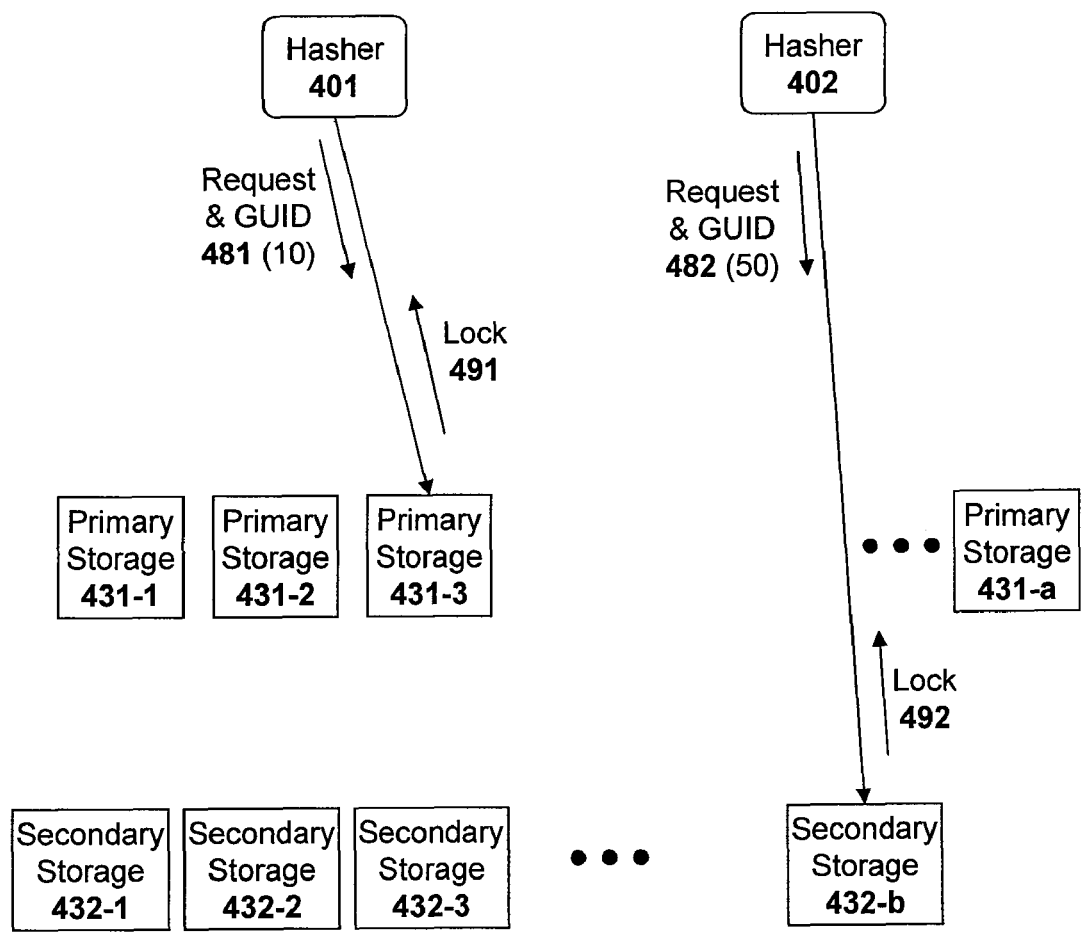
FIG. 4C illustrates the internet based file storage service of FIG. 2A wherein two hasher systems are attempting to simultaneously access the same stored file and a globally unique identifier is sent with the access request.

Referring to FIG. 4C, hasher system 401 and hasher system 402 are again attempting to access the same file. However, in this case when each system requests access the storage unit the request message includes a globally unique identifier (GUID). In the example of FIG. 4C, the request 481 from hasher system 401 to primary storage unit 431-3 includes a GUID with a value of 10 and the request 482 from hasher system 402 to secondary storage unit 432-b includes a GUID with a value of 50. The storage units will each respond with a lock message. Specifically, primary storage unit 431-3 responds to hasher system 401 with lock message 491 and secondary storage unit 432-b responds to hasher system 402 with lock message 492.

Figure 4D:
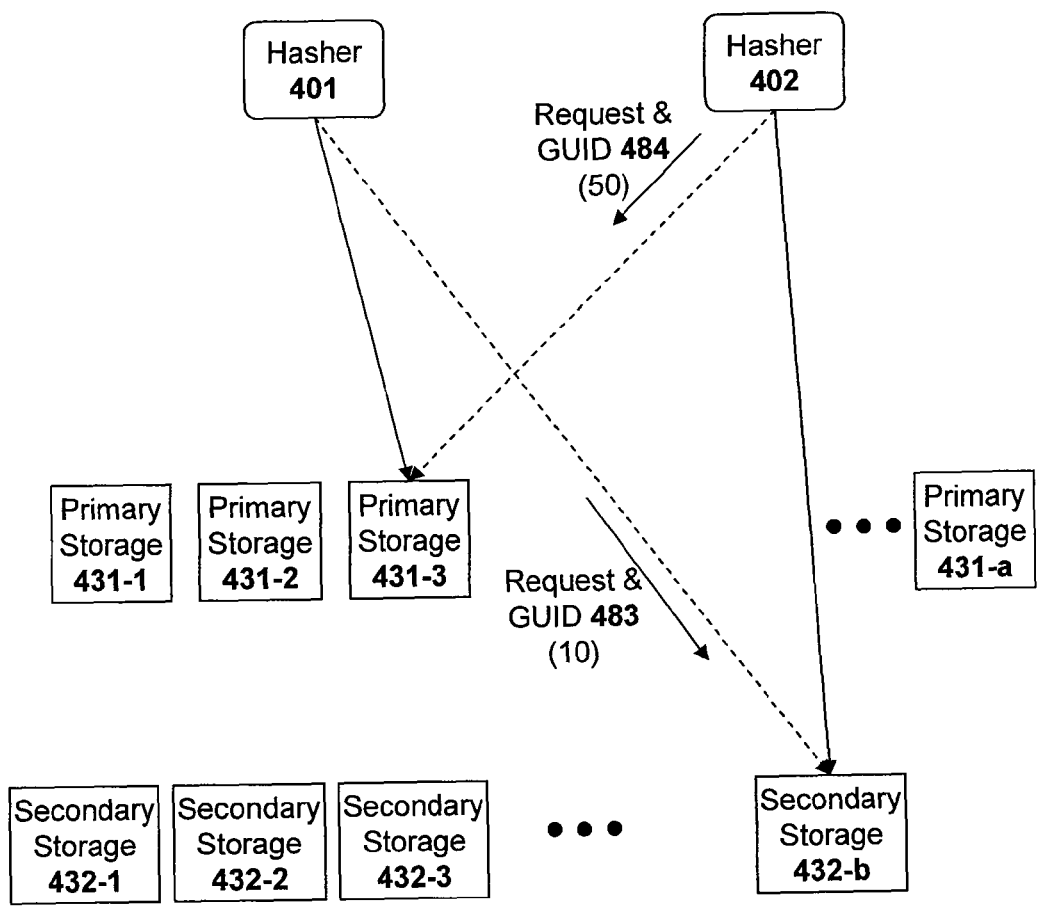
FIG. 4D illustrates the internet based file storage service of FIG. 4C wherein the storage units use the received globally unique identifier to arbitrate a winner between conflicting access requests.

Next, the two hasher systems attempt to access the other copy of the same file. Specifically, hasher system 401 sends request message 483 to secondary storage unit 432-b with the GUID value 10 and hasher system 402 sends request message 484 to primary storage unit 431-3 with the GUID value 50 as illustrated in FIG. 4D. Thus, the potential deadlock situation arises.

To resolve this potential deadlock situation, the storage units each use the globally unique identifier (GUID) received from the hasher systems to resolve and prevent such potential deadlock situations. In one embodiment, a comparison of the two globally unique identifier (GUID) received from the hasher systems is made in each of the two storage units to resolve the deadlock. The hasher system that has a favourable comparison with its GUID will receive a lock on the second storage unit it accessed. The hasher system that has an unfavourable comparison with its GUID will not receive a lock and should thus release the first storage unit that was accessed.

Figure 4E:
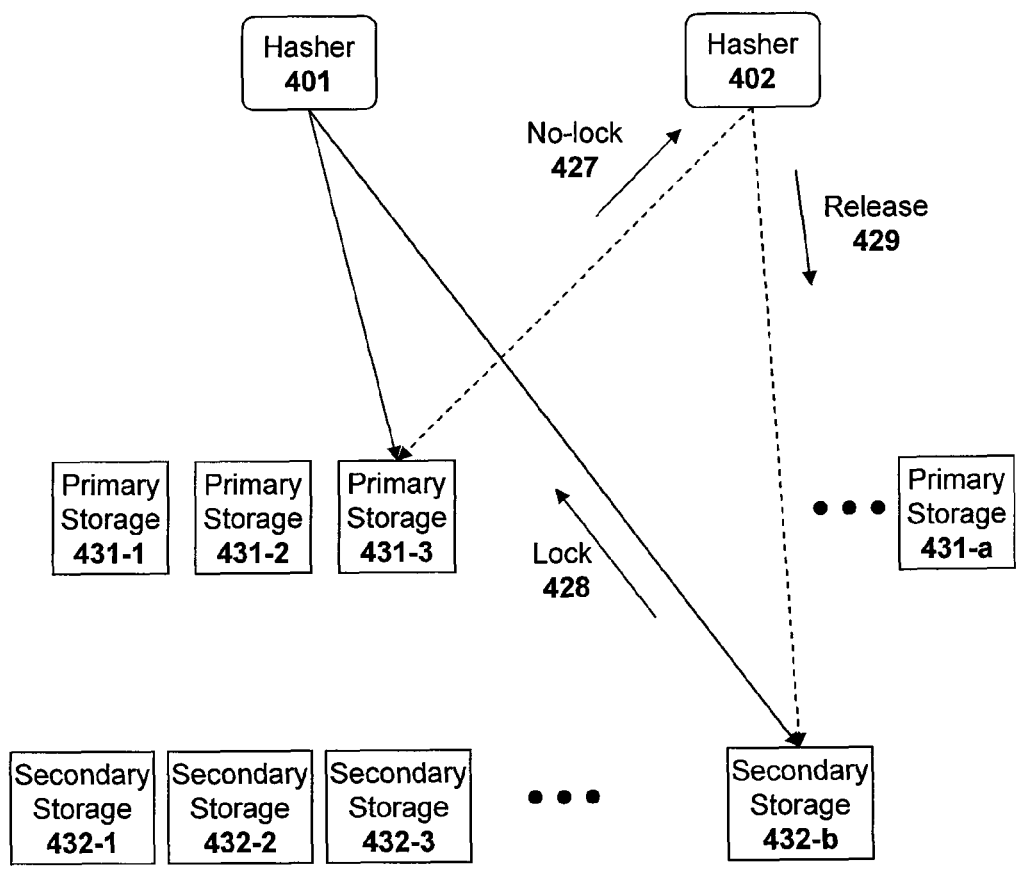
FIG. 4F illustrates the internet based file storage service of FIG. 4D wherein only one of the hasher systems has been granted exclusive access to the requested file.

FIG. 4E illustrates the resolution of a potential deadlock situation. In a system wherein a lower GUID is a favourable comparison, primary storage unit 431-3 will compare the two GUIDs received and determine that the GUID 10 from hasher unit 401 is the winning GUID. Thus, primary storage unit 431-3 will respond to the request 484 from hasher system 402 with a no-lock message 427. Hasher system 402 will receive the no-lock message 427 realize that it will not able to access the desired filed. In one embodiment, the hasher system 402 may report this failure to the client system that made the original file request (not shown). Alternatively, the hasher system 402 may retry at a random interval before giving up. In addition, hasher system 402 will send a release message 429 to secondary storage unit 432-*b*. Having determined that hasher system 401 has won the dispute but it had already granted a lock to hasher system 402, secondary storage unit 432-*b* will be waiting for the release message.

Figure 4F:
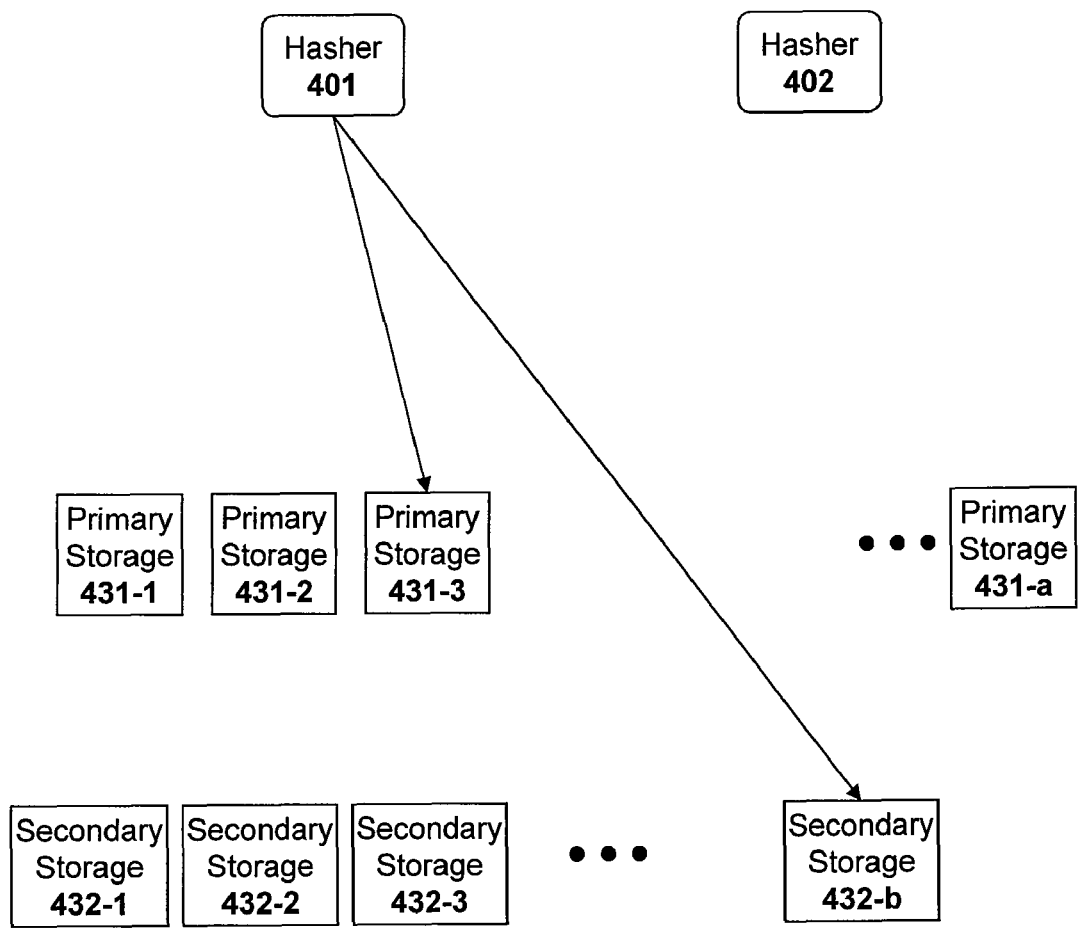

Upon receiving release message 429, secondary storage unit 432-*b* will then send lock message 428 to hasher system 401. At this point, hasher system 401 will have locks on both primary storage unit 431-3 and secondary storage unit 432-*b* such that it may commence with its file access. The end result is illustrated in FIG. 4F wherein hasher system 401 that received the favourable comparison has a lock on both the primary copy of the file in primary storage unit 431-3 and the secondary (back-up) copy of the file in secondary storage unit 432-*b*.

The deadlock system has been disclosed with reference to two copies of each file. However, the same system can be used with more than two copies of the files. The same operation within each storage unit will ensure that a hasher system with a winning GUID value will be given exclusive access to all the needed storage units.

Note that many variations of this system may be created. For example, the globally unique identifier (GUID) may be generated by the storage units and the comparison of the GUIDs may be performed within the hasher systems. Furthermore, it may be the client systems directly accessing the storage units instead of the hasher systems accessing the storage units on behalf to the client systems. Note that having the hasher systems access the storage units on behalf to the client systems has the advantage that no customer will be able to modify the code of the hasher systems as easily as they could possible modify the code in the client systems such that the arbitration system is protected better if it resides within the hasher system.

A Loosely Defined Meta-Data System

As the amount of digitally stored information has greatly increased over the past few years, meta-data has become increasingly important in order to classify and locate a desired computer file among the mass amounts of stored information. Meta-data is generally defined as information about the information (hence the term 'meta'). Typically meta-data that may be maintained for a computer file may include: when the computer file was created, the username of the user that created the computer file, when the computer file was last accessed, the specific application program that created the computer file (if any), any keywords assigned to the computer file, a description of the formatting of the data in computer file, a version number of the file, etc. By assigning as much meta-data to computer files as possible, the computer files can be searched more efficiently and intuitively.

One possible method of maintaining meta-data for the computer files stored in a file storage system would be to create a traditional database to store the meta-data for all of the computer file. A traditional database contains key and value pairs where 'keys' are used to access 'values' stored in the database. A database that stores computer file meta-data could use the computer filenames of files as the keys for the database and the meta-data associated with the files as the values in the database. For example, the following table illustrates a conceptual diagram of a computer database containing meta-data values for three image files containing digital photographs of animals: DogPicture.jpg, CatPicture.jpg, and BirdPicture.jpg.

TABLE 1

A Possible Meta-data Database

| Key | Value |
|---|---|
| DogPicture.jpg | Tag: Cute |
| DogPicture.jpg | Date: 12/1/2007 |
| DogPicture.jpg | Tag: Rover |
| DogPicture.jpg | QualityRating: 4 |
| CatPicture.jpg | Date: 12/5/2007 |
| CatPicture.jpg | Tag: Cute |
| CatPicture.jpg | QualityRating: 5 |
| BirdPicture.jpg | Date: 12/3/2007 |
| BirdPicture.jpg | Tag: Parakeet |
| BirdPicture.jpg | QualityRating: 5 |
| BirdPicture.jpg | Tag: Tweety |

Creating such a database would provide a system of keeping track of all the meta-data associated with the files stored in the file storage server system set forth in the preceding sections. However, such a meta-data database would add an entire additional system that would need to be implemented and maintained for the file storage server system. Furthermore, that meta-data database would also need to be implemented in a very robust and reliable manner with fail safe mechanisms to deal with any component failures.

Instead of creating a such separate database to handle meta-data for the file storage server system, one embodiment of the file storage server system uses the file storage server system itself as a database to store meta-data. To implement this, a separate filename is created for each file in the file storage server system to store the meta-data associated with that file. For example, the suffix "-meta" may be added to each file name to create an associated meta-data file for each file stored in the file storage server system. (Note this is just a simplified example, an implemented system should use a file name modification that cannot be entered by a user as a legal file name in order to prevent aliasing.) Using the meta-data from the example database of Table 1, the meta-data files DogPicture.jpg-meta, CatPicture.jpg-meta, and BirdPicture.jpg-meta may be created to store the associated meta-data for files DogPicture.jpg, CatPicture.jpg, and BirdPicture.jpg, respectively. Those meta-data files for storing associated meta-data may appear as follows:

TABLE 2

DogPicture.jpg-meta meta-data file

Tag: Cute
Date: 12/1/2007
Tag: Rover
QualityRating: 4

TABLE 3

CatPicture.jpg-meta meta-data file

Date: 12/5/2007
Tag: Cute
QualityRating: 5

TABLE 4

BirdPicture.jpg-meta meta-data file

Date: 12/3/2007
Tag: Parakeet

TABLE 4-continued

BirdPicture.jpg-meta meta-data file

QualityRating: 5
Tag: Tweety

In this manner, each file stored in the file storage server system will have an associated meta-data file that can easily be retrieved at the same time as that a file is retrieved. A client system will simply request the retrieval of the meta-data file at the same time as requesting the main file by making file requests for both the main file name (such as "mainfile") and the file name with the meta-data file name modification ("mainfile-meta" per this example).

It should be noted that this meta-data file system is both optional and infinitely expansive. If no meta-data has been assigned to a particular file then no associated meta-data file needs to exist for that file. Furthermore, as new types of meta-data are created and assigned to a file then these new types of meta-data can be added to the existing meta-data file associated with that file. For example, if a person wanted to specify when a file is one of their favorite files then a field for "MyFavorite:" could be added such that the user's favorite files would have a "MyFavorite:Yes" entry in the meta-data file, files are that are not the user's favorite could have a "MyFavorite:No" entry in the meta-data file, and files that have not been judged by the user will not have a "MyFavorite:" entry in the associated meta-data file.

Indexing Mechanism for the Meta-Data System

As set forth in the previous section, a key reason for maintaining meta-data for computer files is to allow for more intuitive searching of the computer files since more types of information about the computer files can be searched. If a traditional database is used to store meta-data about computer files (as set forth with the example of Table 1) then that traditional database will typically have built-in systems that allow for efficient searching of the meta-data in that meta-data database. But since the meta-data system disclosed in the previous section stores meta-data in normal data files instead of in a computer database, it is not easy to perform searches in an efficient manner by directly examining the meta-data stored within separate meta-data files. Specifically, to do an arbitrary search on the meta-data, every single meta-data file would need to be accessed and examined to see if it contained meta-data that met the search criteria.

To provide for more efficient searching of meta-data, some embodiments of the file storage server system implement search indexes that allow for various fields of the meta-data to be searched efficiently. However, to keep the file storage server system simple and efficient, it would be desirable to avoid creating another complicated system that would need to be implemented in a robust and fail-safe manner. But once again, the file storage server system may use the file storage server system itself as means for providing an indexing system for the meta-data stored in the meta-data files.

To use the server storage system as an indexing system for the meta-data, an administrator or the user must decide which particular types of meta-data should be indexed for easy searching. The types of meta-data used for indexing should have a limited number of different possible values since the indexing system will create a file for each different type of possible value as will be disclosed. To disclose the indexing system, an example will be presented using the three animal picture files (DogPicture.jpg, CatPicture.jpg, and BirdPicture.jpg) and their respective meta-data files (Table 2, Table 3, and Table 4) disclosed in the previous section.

Referring to the meta-data files disclosed in Table 2, Table 3, and Table 4, each meta-data file contains a quality rating ("QualityRating") on a 1 to 5 scale that the user has assigned to each the pictures. If the user wishes to be able to search for files based upon the quality rating meta-data then the user will inform the system that a search index should be created and maintained for that quality rating.

When the system is informed that a particular type of meta-data should be indexed for fast searching, the system then examines all the meta-data files for all instances of that data type. The system will note the different meta-data values and the files associated with that meta-data value. The system will then create a file for each different value of meta-data of that meta-data type. Thus, referring to the meta-data files disclosed in Table 2, Table 3, and Table 4, there are two different types of quality ratings that have been assigned: 4 and 5. A different file is then created for each different value of meta-data that was encountered. The file will be created with name that includes the meta-data value such that it can be easily located using the hashing mechanism. Essentially, the meta-data value in the file name is being used as a key and the associated values are the file names that have that particular meta-data value. Thus, using the example data presented above, to create quickly searchable indexes for the quality rating ("QualityRating") meta-data type, the two index files QualityRating4 and QualityRating5 could be created as follows:

TABLE 5

| QualityRating4 file |
| --- |
| DogPicture.jpg |

TABLE 6

| QualityRating5 file |
| --- |
| BirdPicture.jpg |
| CatPicture.jpg |

In this manner, if a client system needed to search for all of the files that have been assigned a quality rating of 5 then the client program would place a request for the file "QualityRating5". The server system would then return the file of Table 6 that contains the file names of CatPicture.jpg and BirdPicture.jpg, the two files having associated meta-data of "QualityRating: 5".

In addition to allowing searching, the meta-data stored in the index files may be stored in a sorted order. For example, the user may request the quality ratings be indexed for searching the and the items in each different quality rating index file be sorted in order of the "Date" meta-data associated with the file. Thus, Table 6 that contains all the files with a quality rating of 5 lists those files in the order of the "Date:" value. Thus BirdPicture.jpg with a 12/3/2007 date is listed before CatPicture.jpg with its 12/5/2007 date.

Meta-Data Indexing Implementation Details

The meta-data indexing system set forth in preceding section can begin to become cumbersome when the amount of data becomes very large. For example, if there are thousands of files and each of the files is given a quality rating ("QualityRating") on a 1 to 5 scale, then there will be only five different meta-data index files and each meta-data index file will contain a very large number of file names.

Having a large number of filenames in an index file can begin to cause problems. For example, although keeping each index file sorted will may greatly aid in users when performing searches, it is not easy to always maintain the meta-data index files in a sorted manner. Every time that a client accesses a file from the file storage server system, alters the meta-data for that file, and then writes back the file then the indexes relating to the meta-data that has been changed need to be updated. If the system were to update every index when ever any piece of meta-data is changed then the system might soon be spending an inordinate amount of time updating and re-sorting meta-data indexes.

To reduce the workload, an appendix file may be kept for each meta-data index file. The appendix file for a particular meta-data index file would contain items that should be in a particular meta-data index file but have not yet been placed into the meta-data index file in order not to waste resources. Thus, when a particular index file must be searched, a binary search would be performed on the main index file and an exhaustive linear search would be performed on the unsorted appendix file. When an appendix file reaches a predetermined size, the system would then perform sort to integrate all the items in the appendix file into the main index file. By only performing a re-sort when a several items have been collected, the system will greatly reduce the amount of work that must be performed in order to keep the indexes current.

The preceding description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method of allowing access to a shared resource, said method comprising: receiving a first request for a file in a first portion of said shared resource, said first request containing a first token value from a first client system;
receiving a second request for said file in a second portion of said shared resource, said second request containing said first token value from said first client system one of said first portion or said second portion being a primary storage location for said file and a remaining portion being a secondary storage location for said file;
performing a first comparison in said first portion of said shared resource based on more than one request being received in said first portion of said shared resource, said first comparison comparing said first token value with a second token value received from a second client system, said token value comprises a globally unique identifier value; and
issuing a no-lock response to said second client system from said first portion of said shared resource based on said first token value comparing favorably against said second token value and issuing a lock response to said first client system from said second portion based on said first token value comparing favorably against said second token value, both said first portion and said second portion being required in order for said first client system to access said shared resource.

2. The method of allowing access to a shared resource as set forth in claim 1, said method further comprising:
releasing said second portion of said shared resource from said second client system in response to said no-lock response.

3. The method of allowing access to a shared resource as set forth in claim 2, said method further comprising:
issuing a lock to said first client system from said second portion of said shared resource in response to said releasing.

4. The method of allowing access to a shared resource as set forth in claim 1, wherein said first portion of said file comprises a primary copy of said file and said second portion of said file comprises a secondary copy of said file.

5. The method of allowing access to a shared resource as set forth in claim 1, said method further comprising:
performing a second comparison in said second portion of said shared resource of said shared resource, said second comparison comparing said first token value with said second token value received from said second client system.

6. A network accessible shared resource, said network accessible shared resource comprising:
a first portion of said shared resource;
a second portion of said shared resource, both said first portion and said second portion being required in order for a client system to access said shared resource, one of said first portion or said second portion being a primary storage location for a file and a remaining portion being a secondary storage location for said file; and
a first comparison unit in said first portion of said shared resource, said first portion of said resource receiving a first request containing a first token value from a first client system and a second request containing a second token value from a second client system, said first comparison unit performing a first comparison comparing said first token value with said second token value, said token comprises a globally unique identifier value;
said first comparison unit issuing a no-lock response to said second client system from said first portion of said shared resource based on said first token value comparing favorably against said second token value and issuing a lock response to said first client system from said second portion based on said first token value comparing favorably against said second token value.

7. The network accessible shared resource as set forth in claim 6, wherein said second client sends a release message to said second portion of said shared resource in response to said no-lock response.

8. The network accessible shared resource as set forth in claim 7, said network accessible shared resource further comprising:
   a second comparison unit in said second portion of said shared resource, said second comparison unit issuing a lock to said first client system in response to said release message.

9. The network accessible shared resource as set forth in claim 6, wherein said first portion of said file comprises a primary copy of said file and said second portion of said file comprises a secondary copy of said file.

10. The network accessible shared resource as set forth in claim 8, wherein said second comparison unit performs a second comparison, said second comparison comparing said first token value with said second token value received from said second client system.

11. A non-transitory computer-readable medium, said computer-readable medium comprising a set of instructions that, when executed by one or more processors implement a method of allowing access to a shared resource, said method comprising:
   receiving a first request for a file in a first portion of said shared resource, said first request containing a first token value from a first client system;
   receiving a second request for said file in a second portion of said shared resource, said second request containing said first token value from said first client system, one of said first portion or said second portion being a primary storage location for said file and a remaining portion being a secondary storage location for said file;
   performing a first comparison in said first portion of said shared resource based on more than one request being received in said first portion of said shared resource, said first comparison comparing said first token value with a second token value received from a second client system, said token comprises a globally unique identifier value;
   issuing a no-lock response to said second client system from said first portion of said shared resource based on said first token value comparing favorably against said second token value; and
   issuing a lock response to said first client system from said second portion based on said first token value comparing favorably against said second token value, both said first portion and said second portion being required in order for said first client system to access said shared resource.

12. The computer-readable medium as set forth in claim 11 wherein said method further comprises:
   releasing said second portion of said shared resource from said second client system in response to said no-lock response.

13. The computer-readable medium as set forth in claim 12 wherein said method further comprises:
   issuing a lock to said first client system from said second portion of said shared resource in response to said releasing.

14. The computer-readable medium as set forth in claim 11, wherein said first portion of said file comprises a primary copy of said file and said second portion of said file comprises a secondary copy of said file.

15. The computer-readable medium as set forth in claim 11 wherein said method further comprises:
   performing a second comparison in said second portion of said shared resource of said shared resource, said second comparison comparing said first token value with said second token value received from a second client system.

\* \* \* \* \*

UNITED STATES PATENT AND TRADEMARK OFFICE
CERTIFICATE OF CORRECTION

PATENT NO. : 8,135,839 B1  
APPLICATION NO. : 12/130129  
DATED : March 13, 2012  
INVENTOR(S) : Matthew A. Wormley et al.

Page 1 of 1

It is certified that error appears in the above-identified patent and that said Letters Patent is hereby corrected as shown below:

In column 17, line 64, delete "system" and insert -- system, --, therefor.

In column 18, lines 35-36, in Claim 5, after "portion" delete "of said shared resource".

In column 20, lines 29-30, in Claim 15, after "portion" delete "of said shared resource".

Signed and Sealed this  
Fourteenth Day of August, 2012

David J. Kappos  
*Director of the United States Patent and Trademark Office*